(12) United States Patent
Curinier

(10) Patent No.: US 9,488,308 B2
(45) Date of Patent: Nov. 8, 2016

(54) FLOW-LIMITING DEVICE

(71) Applicant: Emmanuel Curinier, Biot (FR)

(72) Inventor: Emmanuel Curinier, Biot (FR)

( * ) Notice: Subject to any disclaimer, the term of this patent is extended or adjusted under 35 U.S.C. 154(b) by 134 days.

(21) Appl. No.: 14/367,895

(22) PCT Filed: Dec. 24, 2012

(86) PCT No.: PCT/FR2012/053078
§ 371 (c)(1),
(2) Date: Jun. 20, 2014

(87) PCT Pub. No.: WO2013/093387
PCT Pub. Date: Jun. 27, 2013

(65) Prior Publication Data
US 2014/0345716 A1 Nov. 27, 2014

(30) Foreign Application Priority Data

Dec. 23, 2011 (FR) ...................................... 11 04056

(51) Int. Cl.
| | |
|---|---|
| *F16K 15/03* | (2006.01) |
| *F16L 55/10* | (2006.01) |
| *E03F 5/10* | (2006.01) |
| *F16K 1/20* | (2006.01) |

(52) U.S. Cl.
CPC ............ *F16L 55/1018* (2013.01); *E03F 5/107* (2013.01); *F16K 1/20* (2013.01); *F16K 15/033* (2013.01); *Y10T 137/7898* (2015.04); *Y10T 137/7902* (2015.04)

(58) Field of Classification Search
CPC ............... F16K 1/20; Y10T 137/7898; Y10T 137/7902; F16L 55/1018; E03F 5/107
USPC .................................. 137/527, 527.6, 527.8
See application file for complete search history.

(56) References Cited

U.S. PATENT DOCUMENTS

| | | | | |
|---|---|---|---|---|
| 929,514 A | * | 7/1909 | Tenold | B01D 35/147 137/527.6 |
| 2,463,662 A | * | 3/1949 | Wallace | F01N 13/085 123/198 R |
| 2,767,735 A | * | 10/1956 | Darling | F16K 15/033 137/454.2 |
| 3,292,658 A | | 12/1966 | Scaramucci | |
| 4,787,869 A | * | 11/1988 | Shiozawa | F01N 13/085 137/527.8 |
| 2005/0092372 A1 | | 5/2005 | Wade | |

FOREIGN PATENT DOCUMENTS

| | | |
|---|---|---|
| DE | 4322260 A1 | 1/1995 |
| DE | 10 2009 025576 A1 | 12/2010 |
| FR | 2432663 A1 | 2/1980 |
| GB | 190100921 A | 3/1901 |
| GB | 2449352 A | 11/2008 |
| KR | 2009 0034154 A | 4/2009 |

* cited by examiner

*Primary Examiner* — Craig Schneider
*Assistant Examiner* — P. Macade Nichols
(74) *Attorney, Agent, or Firm* — Im IP Law PLLC; C. Andrew Im

(57) ABSTRACT

A flow-limiting device comprises a stationary portion and a mobile valve comprising an orifice. The mobile valve is kept closed by a forced closure system that enables the mobile valve to limit the flow of a fluid passing through same and opens same to allow a larger flow to pass through when the upstream pressure of the fluid becomes higher than a predetermined value. The orifice of the flow-limiting device can be positioned at the bottom or the periphery of the mobile valve. The forced closing system can comprise at least one spring attached to the stationary portion at one end and to the mobile valve at the other end.

11 Claims, 3 Drawing Sheets

FLOW-LIMITING DEVICE

RELATED APPLICATIONS

This application is a §371 application from PCT/FR2012/053078 filed Dec. 24, 2012, which claims priority from French Patent Application No. 11 04056 filed Dec. 23, 2011, each of which is herein incorporated by reference in its entirety.

TECHNICAL FIELD OF THE INVENTION

This invention relates to a flow-limiting device. It applies in particular to flow control for rainwater outlets.

STATE OF THE ART

The growing impermeabilization of urban areas coupled with more and more intense rain events due to climate change lead to urban run-offs that are increasingly hard to manage. The result is serious floods. To fight against this urban run-off, procuring parties impose more and more constraints on developers so that the new impermeabilizations are compensated for.

These compensations can consist of:

seepage of the storm water over the impermeabilized plots at the source;

controlling the run-off from impermeabilized plots by means of retention basins;

evening out the peak flows passing through the networks by means of retention basins downstream from the impermeabilized areas.

Today, retention of this run-off water can be achieved by means of swales, ditches, permeable roadways with reservoir course, sunken basins, storage conduits, etc. comprising a limited-flow outlet, the orifice and an overflow, which allows the flow surplus to be evacuated when the rain is so heavy that the water flow and volume resulting from the run-off exceeds the facility's retention capacity.

Common to all these techniques is that water storage can only be carried out in relatively flat areas and that their outlet, formed of an aperture with a deliberately limited diameter or evacuation capacity, tends to become clogged if it is not regularly maintained.

The retention of rainwater therefore often requires a lot of space, flat areas, and very regular maintenance.

Document KR 2009 0034154 relates to a non-return valve positioned at the outlet of a network of drainage to a creek or river, a valve wherein the movable portion can open under the pressure of the water and wherein opening is facilitated by means of a float placed in the lower portion. However, this device does not make it possible to regulate the flow passing through it since it does not retain this water, the float aiming, on the contrary, to facilitate the opening of the valve.

Document US 2005/092372 A1 presents a valve whose function is to provide ventilation of water reservoirs while avoiding the proliferation of mosquitoes and other insects. This valve, equipped with a mosquito screen, is designed to let the water pass in one direction without letting insects pass in the other direction.

Document FR 2 432 663 presents a flapper-type valve equipped with a spring to prevent the valve slamming when it is closed.

SUBJECT OF THE INVENTION

The present invention aims to remedy all or part of these drawbacks.

To this end, the present invention envisages, according to a first aspect, a flow-limiting device, which comprises a stationary portion and a movable valve that comprises an orifice and is kept closed by means of a forced closure system that enables the valve to limit the flow of a fluid passing through same and to open in order to allow a larger flow to pass through when the upstream pressure of said fluid becomes higher than a predefined value.

Thanks to these provisions, when the flow of water arriving towards the valve is less than the flow of water passing through the orifice, the water passes through the valve without being retained. When the flow increases, above a certain pressure, the valve does not open and only the flow permitted by the orifice flows through the valve. Above a predefined pressure value, the valve opens and lets all the water pass. In this way, regulation of the flow is achieved. In the event of a flood or heavy rainfall, each valve that is the subject of this invention allows the water to be retained and thus prevents, downstream, the pipes becoming clogged and water overflowing through the manholes. The flow-limiting device that is the subject of the present invention thus plays an overflow security role.

In embodiments, the orifice of the flow-limiting device that is the subject of the present invention is positioned in the bottom portion of the movable valve.

In this way, the water does not remain stagnant upstream of the valve for low flows of water. This form ensures proper cleaning of the system when the valve is opened, any debris blocked in the orifice being carried away by the flow of liquid when the valve is opened.

In embodiments, the orifice is positioned at the periphery of the movable valve.

Thus, unlike a simple aperture, the orifice prevents debris being permanently retained in its opening.

In embodiments, the forced closure system comprises at least one spring attached to the stationary portion at one end and to the movable valve at the other end.

Thus, resistance to opening is set, by the stiffness of the spring, according to the height of water to be retained upstream of the flow-limiting device.

In embodiments, the forced closure system comprises a means of adjustment by prestressing at least one fastening of one end of a spring.

In embodiments, at least one spring is a coiled spring fixed to the movable valve by means of a threaded rod fixed at its ends, passing through the upper portion of the movable valve, and blocked by a nut that comes to rest on the movable valve.

In embodiments, the predefined value corresponds to a height of water that is over one meter above the lowest portion of the movable valve.

In embodiments, the forced closure system comprises at least one elastomer attached to the stationary portion at one end and to the movable valve at the other end.

It is noted that the stiffness of each elastomer, which sets the resistance to opening, is selected according to the height of water to be retained upstream of the flow-limiting device that is the subject of the present invention.

In embodiments, the forced closure system comprises at least one counterweight fixed on the movable valve.

It is noted that the mass of each counterweight is selected according to the height of water to be retained upstream.

According to a second aspect, the present invention envisages a rainwater conduit, which comprises at least one flow-limiting device that is the subject of the present invention.

In embodiments, for each flow-limiting device, the predefined value of the upstream fluid pressure corresponds to a height of water that is lower than the difference in altitude between the orifice of said device and the opening to the exterior of the lowest altitude linked by a continuous incline to said device.

In embodiments, the conduit that is the subject of the present invention comprises a storage conduit, the cross-section of which has an area greater than half a square meter.

In embodiments, the cross-sectional area of the storage conduit is at least equal to four times the area of the movable valve.

According to a third aspect, the present invention envisages a rainwater conduit, which comprises at least one conduit that is the subject of the present invention.

As the advantages, aims and special features of the conduit that is the subject of the present invention and of the rainwater network that is the subject of the present invention are similar to those of the flow-limiting device that is the subject of the present invention they are not repeated here.

BRIEF DESCRIPTION OF THE FIGURES

Other advantages, aims and characteristics of the present invention will become apparent from the description that will follow, made, as an example that is in no way limiting, with reference to the drawings included in an appendix, in which.

DESCRIPTION OF EXAMPLES OF REALIZATION OF THE INVENTION

The aim of the flow-limiting device that is the subject of the present invention is to fill a fluids network, in particular rainwater, located upstream when water flows greater than a limit value predefined by design are observed therein. The flow-limiting device that is the subject of the present invention is designed such that its opening occurs only rarely when the water pressure upstream becomes higher than another limit value predefined by design. The flow-limiting device that is the subject of the present invention then plays an overflow security role.

Figure 1:
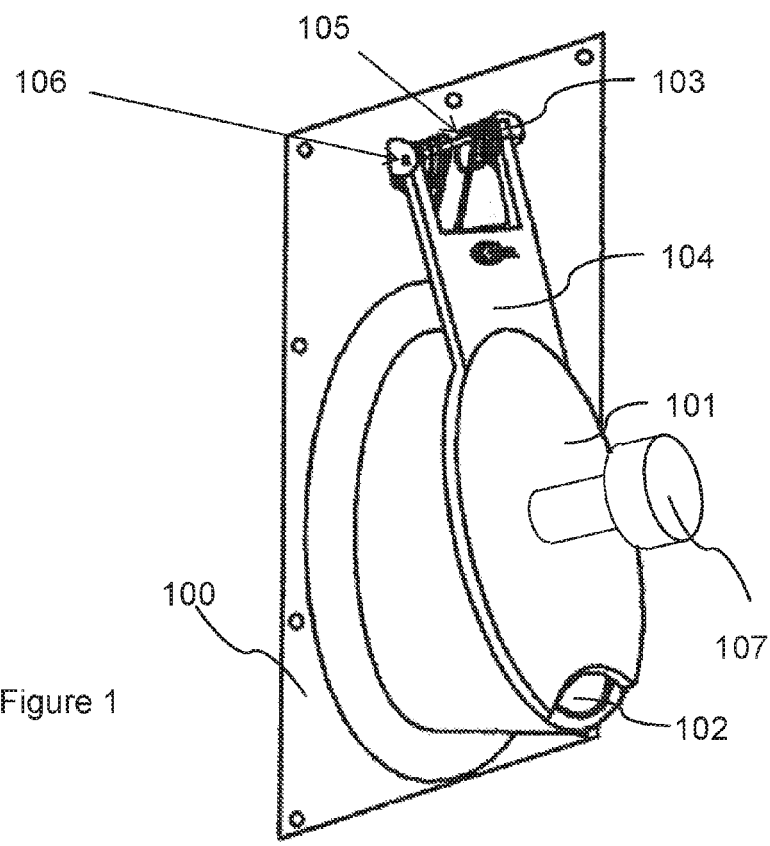
FIG. 1 represents, schematically in three-quarter view, a particular embodiment of a flow-limiting device that is the subject of this invention, in closed position.

With reference to FIG. 1, the flow-limiting device that is the subject of the present invention comprises a stationary portion 100 comprising a tubular body having a slightly inclined end. A movable valve 101, at the base of which an orifice 102 is formed, is kept strongly closed on this end by means of a forced closure system 103 whose closing pressure is chosen to contain a predefined water pressure allowing the filling of a water storage means (not shown in FIG. 1, 203 in FIG. 3) located upstream of the device.

The forced-closure system 103 of the movable valve 102 can be realized, as a non-limiting example, by means of two coiled springs attached to the stationary portion 100 of the device at one end and to the movable valve 101 at the other end, and whose stiffness, which determines the device's resistance to opening, is set according to the height of water to be retained upstream.

In order to adjust the water pressure from which the forced-closure system begins to let the movable valve 101 move and the device to open, at least one coiled spring is equipped with a prestressing means. For example, this prestressing means makes one end of the spring turn around the spring's axis so that the force exerted by this spring in the device's closed position corresponds to the water pressure limit value causing the device to open.

As a non-limiting example and with reference to the forced-closure system made of two coiled springs 103 shown in FIG. 1, such a prestressing device can be realized by means of a threaded rod 105 attached to the ends of the ends of the coiled springs, passing through the upper portion of the movable valve, and blocked by a nut 106 that comes to rest on the movable valve 104.

In variants not shown, the forced closure system 103 comprises at least one vertical, horizontal or oblique mechanical or pneumatic spring. For example, the prestressing means makes it possible to adjust this spring's length for the closed position of the movable valve 101.

In variants not shown, the forced closure system 103 comprises at least one elastomer attached to the stationary portion 100 at one end and to the movable valve 101 at the other end. In this case, the prestressing means controls the length of stiffness of at least one elastomer for the closed position of the movable valve 101, for example.

In variants not shown, the forced closure system 103 comprises at least one counterweight 107 fixed on the movable valve 101. In this case, the prestressing means moves the counterweight 107 vertically on the movable valve 101, for example. The weight moment of this counterweight 107, relative to the axis of rotation of the movable valve 101, thus varies gradually.

Figure 2:
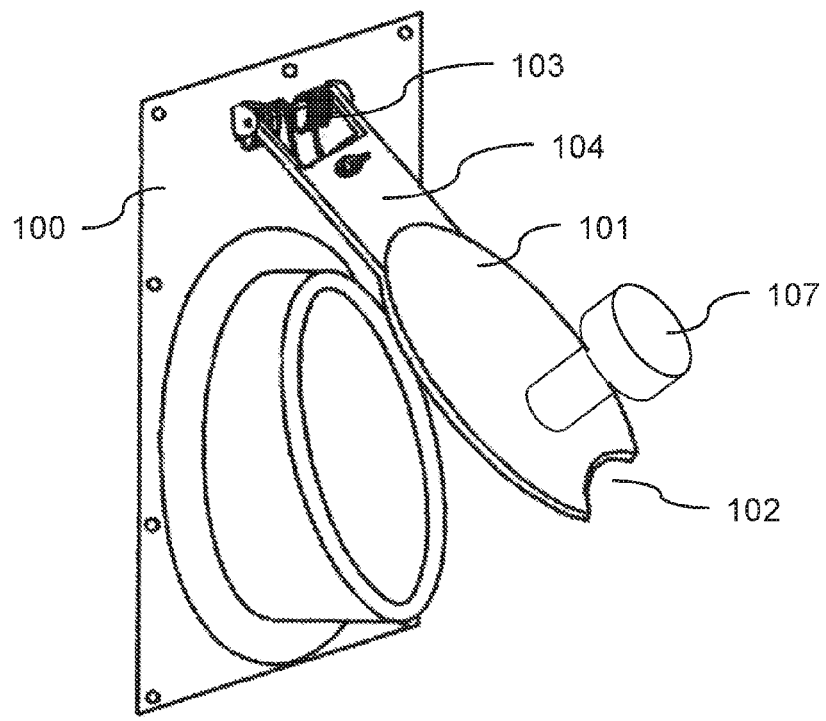
FIG. 2 represents, schematically in three-quarter view, the particular embodiment of a flow-limiting device that is the subject of this invention illustrated in FIG. 1, in open position.

Placed upstream of the water retention device, the flow-limiting device thus limits the output flow thanks to the orifice 102. As shown in FIG. 2, the movable valve 101 opens gradually when the pressure upstream exceeds a predefined limit value, by means of its forced closure system 103.

Figure 3:
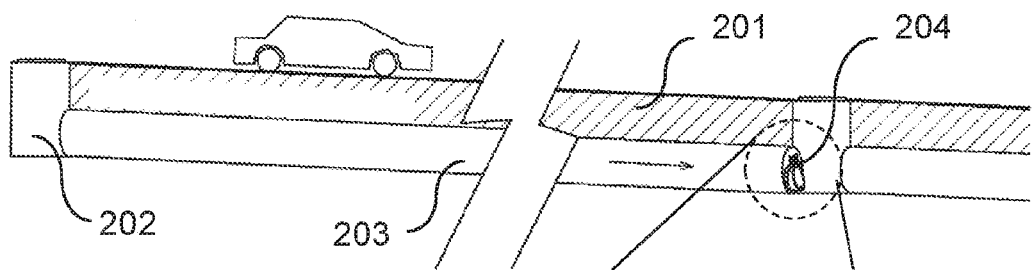
FIG. 3 represents, schematically, an installation under a roadway of a flow-limiting device that is the subject of this invention.
Figure 3:
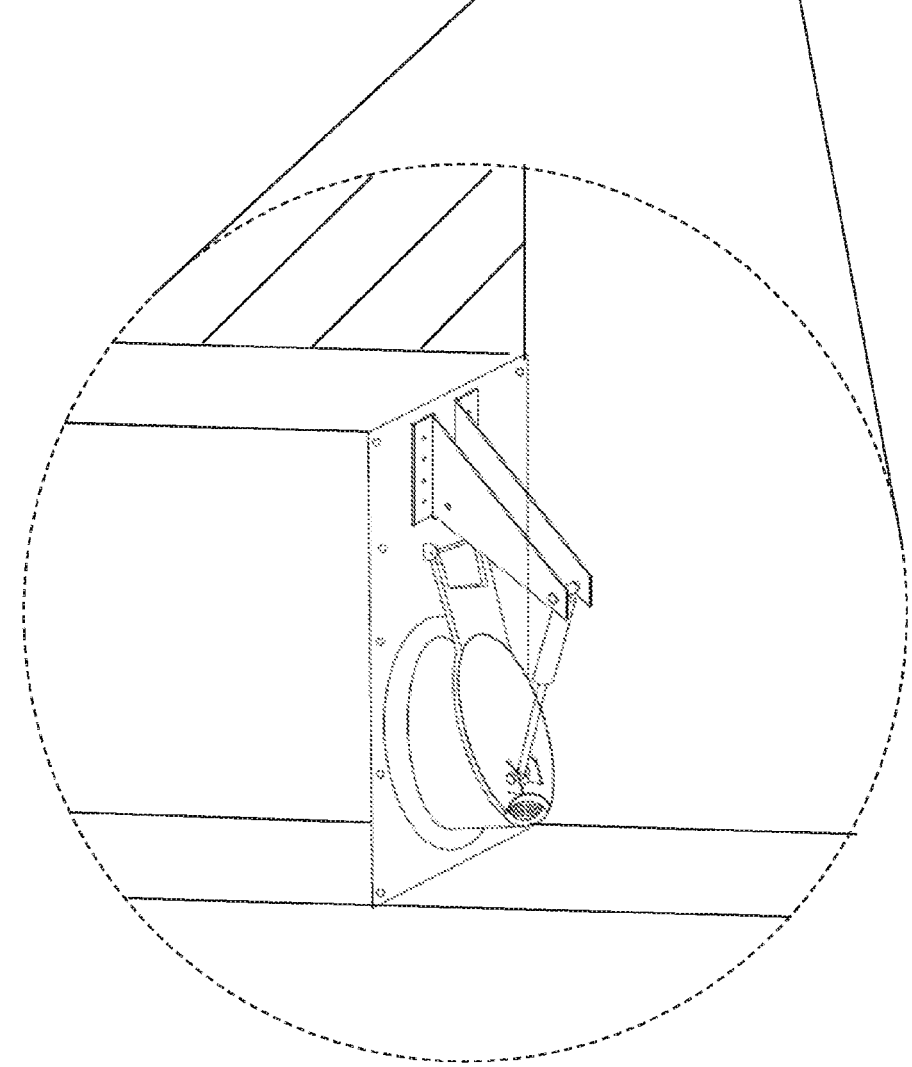

As shown in FIG. 3, as a non-limiting example, the flow-limiting device 204 that is the subject of the present invention can be associated with an oversized storage conduit 203. In these conditions, the conduit 203 being sealed and able to withstand the pressure, it stores water until the height of water in the conduit 203 reaches the predefined pressure that triggers the opening of the movable valve 101. If the incoming flow remains strong, the movable valve 101 remains open, and the outgoing flow can increase, until the movable valve 101 is completely open, when the height of water stored reaches a maximum level. This maximum level is set to a height below that of the level of a manhole 202, a grating or a drain hole having the lowest altitude connected to the storage conduit 203, to prevent any overflow onto a roadway 201.

Preferably, for each flow-limiting device 204, the predefined value of the upstream fluid pressure corresponds to a height of water that is lower than the difference in altitude between the orifice 102 of said device 204 and the opening to the exterior of the lowest altitude linked by a continuous incline to said device 204.

The flow-limiting device 204 that is the subject of the present invention, associated with an oversized conduit 203, thus makes it possible to carry out sub-soil retention 201, without additional easements, including under a sloping roadway. This results in very significant space savings in the urban areas that are frequently most affected by run-off problems.

When the movable valve 101 opens, the unavoidable deposits blocked in front of the orifice 102 are evacuated with the water flow, which prevents any clogging and reduces maintenance to just an operational check. To this end, preferably, the orifice 102 of the movable valve 101 is formed at its base and has a non-jointed shape, which, compared to an aperture formed in the movable valve 101 and surrounded by it, prevents the debris remaining stuck even when the movable valve 101 opens.

FIG. 3 presents a non-limiting example of use of the flow-limiting device with an 800 mm-diameter storage conduit 203, installed at a 4% incline and 80 cm under the natural ground, which corresponds to the usual technical instructions. Thus, preferably, the cross-sectional area of the storage conduit 203 is greater than half a square meter.

In this configuration, by inserting a flow-limiting device 204 that is the subject of the present invention every 20 meters in a manhole, storage of approximately half a cubic meter of water per linear meter of conduit is obtained. This makes it possible to compensate for a road approximately five meters wide with no other retention unit and without overflow onto the roadway 201. The number of flow-limiting devices 204 that are the subjects of the present invention required with respect to the length of storage conduits is calculated so as to optimize the storage volume. This number varies according to the incline and the depth of the installation. The shallower the incline of the road and the deeper the conduit, the fewer flow-limiting devices 204 the subject of the present invention are required. In this configuration, such a flow-limiting device 204 as the subject of the present invention can be equipped with a forced closure system capable of withstanding a water pressure of over one meter, for example 1.3 meters.

Figure 4:
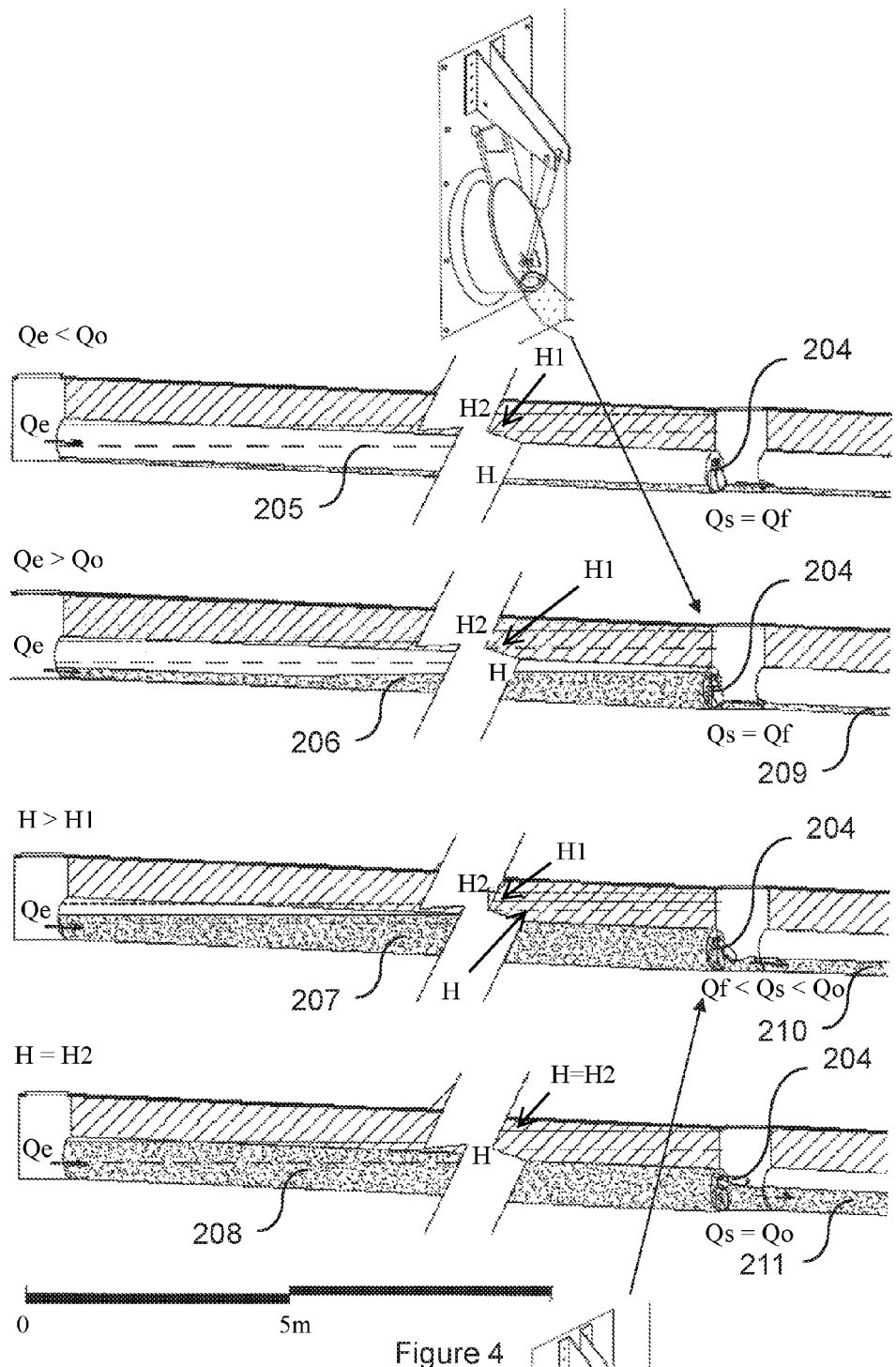
FIG. 4 illustrates, in four steps, the operation of a flow-limiting device that is the subject of the present invention when the flow of water arriving upstream gradually increases.

FIG. 4 illustrates, in four steps, the operation of a flow-limiting device 204 that is the subject of the present invention utilized according to the installation illustrated in FIG. 3.

The upstream water level, in the storage conduit 203, which triggers the opening of the valve, is designated "H1". The forced-closure means 103 is regulated such that it is completely open when the upstream water height reaches a level "H2", corresponding to the dashed line designated "Qe" 205. This set-point level H2, which corresponds to the movable valve 101 being completely open, is set such that the water cannot overflow onto the roadway 201. This level H2 is therefore below the level of the lowest grating or drain hole connected to the storage conduit 203 in question.

According to the non-limiting example described above (800 mm-diameter storage conduit, installed at a 4% incline and 80 cm under the natural ground), the value H2 may be set at approximately 1.5 meters, which signifies that the movable valve 101 would be completely open when the height of water stored upstream reaches 1.5 meters, relative to the water flow at the location of the orifice 102.

When the movable valve 101 is closed, the discharging of the water is limited by the movable valve 101, which thus forms an orifice 102, as illustrated in the top of FIG. 4. The evacuation capacity of this orifice 102 is to be determined according to the type of retention desired, the storage volume available and the surface area of the impermeabilized area located upstream. The run-off water collected transits in the storage conduit 203. When the incoming flow resulting from the run-off is greater than the evacuation capacity of the orifice of the movable valve 101, the water level 206 rises in the storage conduit 203. Consequently, the storage conduit 203 begins to fill, as illustrated in the second diagram of FIG. 4, starting from the top. The flow peak thus crests at the value given by the orifice 102, the movable valve 101 being closed, flow designated "Qf".

As long as the rain continues, the outgoing flow, designated "Qs", delivered downstream from the flow-limiting device 204 remains that given by the orifice 102 and the water level, designated "H", 207 rises in the storage conduit 203. When the level 207 reaches the trigger level H1, for example 30 cm below the level of the lowest grating or drain hole connected to the storage conduit 203, the movable valve 101 begins to open, gradually increasing the outgoing flow released downstream (overflow function). This step is illustrated in the third diagram from the top in FIG. 4.

If the upstream water level H 208 continues to rise and reaches height H2, the movable valve 101 finishes by being completely open, delivering the open-valve flow designated "Qo", equivalent to a 400 mm-diameter conduit, without head loss, which corresponds to the sizing of a traditional network for the road in question. This step is illustrated in the last diagram from the top in FIG. 4.

Thus, preferably, the diameter of the storage conduit 203 is at least equal to twice the diameter of the movable valve 101. In other terms, preferably, the cross-sectional area of the storage conduit 203 is at least equal to four times the area of the movable valve 101.

The flow-limiting device 204 can also be associated with a small individual retention basin (not shown). In this case, the flow-limiting device 204 allows a small-diameter orifice to be installed, without risk of clogging.

The advantages of the flow-limiting device 204 include the following:
  storage on inclines is possible, thanks to the use of storage
    conduits installed under a roadway following the same
    profile as the road;
  self-cleaning is performed with each heavy rain, therefore
    no preventive cleaning is required;
  no clogging of the orifice;
  gradually-opening overflow, preventing flow peaks that
    are difficult to manage;
  simple, rapid, adaptable installation;
  no filter required upstream;
  use on old conduits possible, to give them an operation
    close to a natural discharge (progressivity from the
    network's reaction);
  in cases of heavy rain, total opening of the valve for a
    discharge equivalent to that of a traditional network
    without head losses; and
  the possibility, when associated with fairly small retention
    systems, of installing a small-diameter orifice without
    clogging.

The flow-limiting device 204 combines, in a single unit, the orifice (flow-limiting aperture) and overflow functions. It allows water retention to be performed in limited space (storage under a roadway) under sloping roadways and without clogging the orifice.

The flow-limiting device 204 can be used on all rainwater networks, located in urban centers where space is scarce and/or the significant run-off during rainy weather can cause floods. More generally, the flow-limiting device that is the subject of the present invention is justified everywhere where regulating drainage imposes devices compensating for impermeabilized areas (roads, car parks, subdivisions, large surfaces, real estate programs, airports, etc.).

Associated with a storage system, it allows sub-soil retention to be performed without additional easements, including under a sloping roadway, hence a significant saving of space in an urban area.

In variants not shown, the orifice 102 is an open aperture in the movable valve 101. As described above these variants are not preferential for reasons for reasons of risk of obstruction by clogging.

In non-preferential variants not shown, the orifice is formed on another portion than the lowest portion of the movable valve 101. In this way constant water retention is achieved.

The invention claimed is:

1. A rainwater conduit comprising at least one flow-limiting device, comprising a stationary portion and a movable valve, the movable valve comprising an orifice, the movable valve being kept closed by a forced closure system that enables the movable valve to limit the flow of a fluid passing through the movable valve and to open to allow a larger flow to pass through the movable valve in response to an upstream pressure of the fluid being higher than a predefined value, wherein the predefined value of the upstream fluid pressure corresponds to a height of the water that is lower than a difference in an altitude between the orifice of said at least one flow-limiting device and an opening to an exterior of a lowest altitude linked by a continuous incline to said at least one flow-limiting device.

2. The rainwater conduit device according to claim 1, wherein the orifice is positioned in a bottom portion of the movable valve.

3. The rainwater conduit device according to claim 1, wherein the orifice is positioned at a periphery of the movable valve.

4. The rainwater conduit device according to claim 1, wherein the forced closure system comprises at least one spring attached to the stationary portion at one end and to the movable valve at another end.

5. The rainwater conduit device according to claim 4, wherein the forced closure system is adjustable by pre-stressing at least one fastening of one end of the spring.

6. The rainwater conduit device according to claim 4, wherein the at least one spring is a coiled spring fixed to the movable valve by a threaded rod fixed at a first end and a second end, passing through an upper portion of the movable valve, and blocked by a nut that comes to rest on the movable valve.

7. The rainwater conduit device according to claim 1, wherein the predefined value corresponds to a height of water that is over one meter above a lowest portion of the movable valve.

8. The rainwater conduit device according to claim 1, wherein the forced closure system comprises at least one counterweight fixed on the movable valve.

9. The rainwater conduit according to claim 1, further comprising a storage conduit having a cross-sectional area greater than half a square meter.

10. The rainwater conduit according to claim 1, further comprising a storage conduit having a cross-sectional area at least equal to four times an area of the movable valve.

11. A rainwater network comprising at least one rainwater conduit according to claim 1.

* * * * *